(12) United States Patent
Irvin et al.

(10) Patent No.: US 12,240,976 B2
(45) Date of Patent: Mar. 4, 2025

(54) FILLED COMPOSITES WITH DECREASED THERMAL CONDUCTIVITY, DIELECTRIC CONSTANT, AND WEIGHT

(71) Applicant: BLUESHIFT MATERIALS, INC., Spencer, MA (US)

(72) Inventors: David J. Irvin, San Marcos, TX (US); Alan D. Sakaguchi, San Antonio, TX (US); Alysa Joaquin, San Marcos, TX (US); Garrett D. Poe, Austin, TX (US); Nicole Lambdin, San Marcos, TX (US); Mike Merwin, San Marcos, TX (US)

(73) Assignee: BLUESHIFT MATERIALS, INC., Spencer, MA (US)

( * ) Notice: Subject to any disclaimer, the term of this patent is extended or adjusted under 35 U.S.C. 154(b) by 792 days.

(21) Appl. No.: 17/277,852

(22) PCT Filed: Sep. 19, 2019

(86) PCT No.: PCT/US2019/051977
§ 371 (c)(1),
(2) Date: Mar. 19, 2021

(87) PCT Pub. No.: WO2020/061344
PCT Pub. Date: Mar. 26, 2020

(65) Prior Publication Data
US 2021/0347992 A1    Nov. 11, 2021

Related U.S. Application Data

(60) Provisional application No. 62/733,714, filed on Sep. 20, 2018.

(51) Int. Cl.
*C08L 77/02* (2006.01)
*C08J 5/18* (2006.01)
(Continued)

(52) U.S. Cl.
CPC .............. *C08L 77/02* (2013.01); *C08J 5/18* (2013.01); *C08L 63/00* (2013.01); *C08L 67/00* (2013.01);
(Continued)

(58) Field of Classification Search
CPC .......... C08L 77/02; C08L 63/00; C08L 67/00; C08L 2203/12; C08L 2203/16;
(Continued)

(56) References Cited

U.S. PATENT DOCUMENTS

| 4,478,963 A | 10/1984 | McGarry |
| 7,790,787 B2 | 9/2010 | Williams et al. |

(Continued)

FOREIGN PATENT DOCUMENTS

| CN | 104250442 A | 12/2014 |
| CN | 104558745 A | 4/2015 |

(Continued)

OTHER PUBLICATIONS

International Search Report and Written Opinion Issued in Corresponding PCT Patent Application No. PCT/US2019/051977, dated Nov. 21, 2019.

(Continued)

*Primary Examiner* — K. Boyle
(74) *Attorney, Agent, or Firm* — NORTON ROSE FULBRIGHT US LLP

(57) ABSTRACT

Aerogel filled polymeric composites, methods of making and uses thereof are described. A polymeric composite material can include a continuous polymeric matrix and a discontinuous phase that includes a plurality of polymeric aerogel particles dispersed within the continuous polymeric matrix.

19 Claims, 11 Drawing Sheets

(51) Int. Cl.
    *C08L 63/00*     (2006.01)
    *C08L 67/00*     (2006.01)

(52) U.S. Cl.
    CPC ........ *C08J 2363/00* (2013.01); *C08J 2367/00* (2013.01); *C08J 2377/02* (2013.01); *C08L 2203/12* (2013.01); *C08L 2203/16* (2013.01); *C08L 2203/30* (2013.01)

(58) Field of Classification Search
    CPC ......... C08L 2203/30; C08L 67/02; C08J 5/18; C08J 2363/00; C08J 2367/00; C08J 2377/02
    See application file for complete search history.

(56) References Cited

U.S. PATENT DOCUMENTS

| | | | |
|---|---|---|---|
| 9,777,126 B2 | 10/2017 | Williams et al. | |
| 9,963,571 B2 | 5/2018 | Sakaguchi et al. | |
| 10,011,719 B1 | 7/2018 | Meador et al. | |
| 2003/0096123 A1* | 5/2003 | Yeager .................. | C08K 5/103 428/461 |
| 2006/0196689 A1* | 9/2006 | Ristic-Lehmann ...... | C08K 3/22 524/545 |
| 2007/0259169 A1 | 11/2007 | Williams et al. | |
| 2008/0287561 A1* | 11/2008 | Menashi .................... | C08J 9/32 521/142 |

FOREIGN PATENT DOCUMENTS

| | | |
|---|---|---|
| CN | 104629583 | 5/2015 |
| CN | 106189066 A | 12/2016 |
| CN | 107099117 A | 8/2017 |
| CN | 107531494 A | 1/2018 |
| CN | 107922652 A | 4/2018 |
| CN | 108348871 A | 7/2018 |
| EP | 0512401 | 11/1992 |
| WO | WO 2005/003476 | 1/2005 |
| WO | WO 2007/047970 | 4/2007 |
| WO | WO 2010/144802 | 12/2010 |
| WO | WO 2014/189560 | 11/2014 |
| WO | WO 2018/078512 | 5/2018 |
| WO | WO 2018/140804 | 8/2018 |
| WO | WO 2019/210094 | 10/2019 |

OTHER PUBLICATIONS

Office Action issued in Corresponding Japanese Application No. 2021-515452, dated Sep. 28, 2023 (English Translation provided).
English Translation of Office Action issued in corresponding Chinese Patent Application No. 201980061543.5 dated Feb. 28, 2023.

* cited by examiner

FILLED COMPOSITES WITH DECREASED THERMAL CONDUCTIVITY, DIELECTRIC CONSTANT, AND WEIGHT

CROSS-REFERENCE TO RELATED APPLICATIONS

This application is a national phase application under 35 U.S.C. § 371 of International Application No. PCT/US2019/051977, filed Sep. 19, 2019, which claims priority to U.S. Provisional Application No. 62/733,714 filed Sep. 20, 2018. Each of the referenced applications are incorporated herein in their entirety without disclaimer.

BACKGROUND OF THE INVENTION

A. Field of the Invention

The invention generally concerns the polymeric composite materials that include a continuous polymeric matrix and a discontinuous phase containing a plurality of polymeric aerogel particles dispersed within the continuous polymeric matrix.

B. Description of Related Art

Polymeric-based composites generally have are known to have low thermal conductivity as compared to metals and/or ceramic based materials, thus they are good thermal insulators. To change the thermal conductivity of the polymers additives can be added to the polymeric matrix. For example, graphite carbon fibers, ceramics (e.g., aluminum nitride and boron nitride), glass, aerogel particles and the like can be used. For example, U.S. Pat. Nos. 7,790,787 and 9,777,126 to Williams et al. describes adding aerogels to thermoplastic polymers in a weight ratio of aerogel to thermoplastic polymer to of less than 20:100 to improve the heat insulating capabilities of the polymeric composites. The applications of thermoset polymers are somewhat limited by constraints of material thickness, as increased volumes of curing resin are prone to cracking due to the rapid heating/cooling behaviors characteristic of the peak exotherm.

While various attempts to make polymeric composites have been described, materials having improved insulating properties while maintaining textural properties of the polymeric composite are desired.

SUMMARY OF THE INVENTION

A discovery has been made that solves some of the problems associated with polymeric composites containing additives. The discovery is premised on a polymeric composite material that includes polymeric matrix having a plurality of polymeric aerogel particles (e.g., polyimide aerogel particles) dispersed therein. The resulting polymeric composites have improved heat insulating properties while maintaining textural properties when compared to the unfilled polymeric composite. Notably, and as exemplified in a non-limiting manner in the Examples, that during curing of the polymeric composites, the peak exotherm can be delayed and with the addition of the aerogel particles. It was surprisingly found that addition of the polymeric aerogel particles increased the deflection temperature (HDT) of the polymeric composition when compared to unfilled polymeric composites. Furthermore, the resulting polymeric composites have lowered dielectric constants and/or thermal conductivity as compared same polymeric composite material that does not include the plurality of polymeric aerogel particles. Without wishing to be bound by theory, it is believed that the air trapped in the pores of the aerogel assists in lowering the dielectric constant and/or thermal conductivity.

In one aspect of the present invention, polymeric composite materials are described. The polymeric composite material can include a continuous polymeric matrix, and a discontinuous phase that includes a plurality of polymeric aerogel particles dispersed within the continuous polymeric matrix. The polymeric matrix can include a thermoplastic polymer or a blend of thermoplastic polymers, a thermoset polymer, a blend of thermoset polymers, or any combination thereof. Non-limiting examples of thermoplastic polymers include a polyolefin or a blend thereof, or more preferably polyethylene or polypropylene or a blend thereof. Non-limiting examples of thermoset polymers include a dicyclopentadiene modified polyester, an isophthalic based polyester, an orthophthalic based polyester, or a blend thereof. In some embodiments, the continuous polymeric matrix can include a polyester, a polyamide, a polyepoxide, or any combination or blend thereof. In certain aspects, the continuous polymeric matrix include the polyamide, such as nylon. Non-limiting examples of nylon include polycaprolactam (nylon 6), poly[imino(1,6-dioxohexamethylene) iminohexamethylene] (nylon 6,6), poly(dodecano-12-lactam) (nylon 12), or any blend thereof. The plurality of polymeric aerogel particles can include organic polymer based aerogel particles. In a preferred instance, polyimide aerogel particles can be used. In some aspects, the plurality of polymeric aerogel particles can have an average size of 5 μm to 500 μm, preferably 20 μm to 250 μm, more preferably 25 μm to 150 μm, or even more preferably 50 μm to 100 μm. In some instances, the plurality of polymeric aerogel particles can have a multi-modal particle size distribution (e.g., a bimodal particle size distribution). The polymeric composite material can include 0.5 wt. % to 10 wt. %, preferably 1 wt. % to 8 wt. %, or more preferably 1 wt. % to 6 wt. %, or about 4 wt. % of the plurality of polymeric aerogel particles, based on the total weight of the continuous polymeric matrix and the discontinuous phase or 2 vol. % to 80 vol. %, preferably 5 vol. % to 50 vol. %, or more preferably 5 vol. % to 15 vol. %, or about 10 vol. % of the plurality of polymeric aerogel particles, based on the total volume of the continuous polymeric matrix and the discontinuous phase. Thermal conductivity (W/m·K) of the polymeric composite material can be the same or less than the same polymeric composite material that does not include the discontinuous phase comprising the plurality of polymeric aerogel particles while the compressive yield strength (MPa), compressive modulus strength (GPa), and/or yield strain (%) of the polymeric composite material can be the same or changed (e.g., less than, within 5%, equal to, or increased) when compared with the same polymeric composite material that does not include the discontinuous phase comprising the plurality of polymeric aerogel particles. For example, the thermal conductivity of the polymeric composite of the invention can be the same as that of a polymeric composite material that does not include the discontinuous phase comprising the plurality of polymeric aerogel particle while the mechanical strength is less, but still suitable for a desired application. In another example, the thermal conductivity of the polymeric composite material can be the less than the same polymeric composite material that does not include the discontinuous phase comprising the plurality of polymeric aerogel particles while the compressive yield strength (MPa), compressive modulus strength (GPa), and/or yield strain (%) of the polymeric composite material can be the same or changed (e.g., less than, within 5%, equal to, or increased) when compared with the same polymeric composite material that does not include the discontinuous phase comprising the plurality of polymeric aerogel particles. The dielectric constant of the polymeric composite material can be less than the same polymeric composite material that does not include the discontinuous phase comprising the plurality of polymeric aerogel particles. One or more additive can be dispersed or solubilized within the continuous polymeric matrix. Additive(s) can include an inorganic additive, preferably glass particles, glass fibers, glass spheres, hollow glass spheres, ceramic spheres, polytetrafluoroethylene. The composite material can be any shape or size. For example, the material can be in the shape of a film or a fiber (e.g., a melt-spun fiber, a dry spun fiber, or a wet-spun fiber).

Articles of manufacture that include the polymeric composite material of the present invention are also described. Articles of manufacture can include a film, monolith, wafer, blanket, core composite material, a substrate for radiofrequency antenna, substrate for a sunshield, a substrate for a sunshade, a substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus, or any combination thereof. The article of manufacture can be an injection molded or blow molded article of manufacture.

Methods of making the polymeric composite material of the present invention are also described. A method can include dispersing the plurality of polymeric aerogel particles into a polymeric composition to form the polymeric composite material of the present invention. Dispersing can include through casting, melt blending, or extruding the particles with the polymeric composition.

Methods of changing the viscosity and/or HDT of a polymeric composition are also described. A method for changing (e.g., increasing or decreasing) the viscosity of a polymeric composition can include dispersing a sufficient amount (e.g., 1 wt. % to 50 wt. %, preferably 5 wt. % to 40 wt. %, or 10 wt. % to 20 wt. %) of a plurality of polymeric aerogel particles within the polymeric composition to change the viscosity of the polymeric composition when compared with the same polymeric composition that does not include the plurality of polymeric aerogel particles. The aerogel particles can have a particle size of 10 to 150 micrometers, or about 30 to 125 micrometers. A method for increasing the HDT of a polymeric composition can include dispersing a sufficient amount of a plurality of polymeric aerogel particles within the polymeric composition to change, preferably increase, the HDT of the polymeric composition when compared with the same polymeric composition that does not include the plurality of polymeric aerogel particles.

Methods for reducing the peak exotherm during curing of a thermoset polymer are described. A method can include dispersing a sufficient amount of a plurality of polymeric aerogel particles within the polymeric thermoset composition to reduce the peak exotherm of the polymeric thermoset composition when compared with the same polymeric thermoset composition that does not include the plurality of polymeric aerogel particles. The onset exotherm can be delayed by 0.25 hours to 2 hours, preferably 0.3 hours to 0.75 hours and/or the peak exotherm can be reduced by 5 to 50° C., preferably 10 to 30° C., more preferably 15 to 25° C.

In one aspect of the present invention 33 embodiments are described. Embodiment 1 is a polymeric composite material comprising: a continuous polymeric matrix; and a discontinuous phase comprising a plurality of polymeric aerogel particles dispersed within the continuous polymeric matrix. Embodiment 2 is the polymeric composite material of embodiment 1, wherein the continuous polymeric matrix comprises a polyester, a polyamide, a polyepoxide, or any combination or blend thereof. Embodiment 3 is the polymeric composite material of embodiment 2, wherein the continuous polymeric matrix comprises the polyamide, and wherein the polyamide is a nylon, preferably polycaprolactam, poly[imino(1,6-dioxohexamethylene) iminohexamethylene], poly(dodecano-12-lactam), or any blend thereof. Embodiment 4 is the polymeric composite material of any one of embodiments 1 to 3, wherein the plurality of polymeric aerogel particles are organic polymer aerogels, preferably polyimide aerogel particles. Embodiment 5 is the polymeric composite material of any one of embodiments 1 to 4, wherein the plurality of polymeric aerogel particles has an average size of 5 µm to 500 µm, preferably 20 µm to 250 µm, more preferably 25 µm to 150 µm, or even more preferably 50 µm to 100 µm. Embodiment 6 is the polymeric composite material of any one of embodiments 1 to 5, wherein the plurality of polymeric aerogel particles has multi-modal particle size distribution, preferably a bimodal particle size distribution. Embodiment 7 is the polymeric composite material of any one of embodiments 1 to 6, wherein the polymeric composite material comprises 0.5 wt. % to 10 wt. %, preferably 1 wt. % to 8 wt. %, or more preferably 1 wt. % to 6 wt. %, or about 4 wt. % of the plurality of polymeric aerogel particles, based on the total weight of the continuous polymeric matrix and the discontinuous phase. Embodiment 8 is the polymeric composite material of any one of embodiments 1 to 7, wherein the polymeric composite material comprises 2 vol. % to 80 vol. %, preferably 5 vol. % to 50 vol. %, or more preferably 5 vol. % to 15 vol. %, or about 10 vol. % of the plurality of polymeric aerogel particles, based on the total volume of the continuous polymeric matrix and the discontinuous phase. Embodiment 9 is the polymeric composite material of any one of embodiments 1 to 8, wherein the thermal conductivity (W/m·K) of the polymeric composite material is the same or decreased when compared with the same polymeric composite material that does not include the discontinuous phase comprising the plurality of polymeric aerogel particles. Embodiment 10 is the polymeric composite material of any one of embodiments 1 to 9, wherein the dielectric constant of the polymeric composite material is decreased when compared with the same polymeric composite material that does not include the discontinuous phase comprising the plurality of polymeric aerogel particles. Embodiment 11 is the polymeric composite material of any one of embodiments 1 to 10, wherein the compressive yield strength (MPa), compressive modulus strength (GPa), and/or yield strain (%) of the polymeric composite material is the same or changed when compared with the same polymeric composite material that does not include the discontinuous phase comprising the plurality of polymeric aerogel particles. Embodiment 12 is the polymeric composite material of any one of embodiments 1 to 11, wherein the polymeric matrix comprises a thermoplastic polymer or a blend of thermoplastic polymers, preferably a polyolefin, a fluoropolymer or derivative thereof, or a blend thereof, or more preferably polyethylene or polypropylene or a blend thereof. Embodiment 13 is the polymeric composite material of any one of embodiments 1 to 12, wherein the polymeric matrix comprises a thermoset polymer or a blend of thermoset polymers, preferably, a dicyclopentadiene modified polyester, an isophthalic based polyester, an orthophthalic based polyester, or a blend thereof. Embodiment 14 is the polymeric composite material of any one of embodiments 1 to 13, further comprising an additive that is dispersed or solubilized within the continuous polymeric matrix. Embodiment 15 is the polymeric composite material of embodiment 14, wherein the additive is an inorganic additive or polytetrafluoroethylene, preferably glass particles, glass fibers, glass spheres, hollow glass spheres, ceramic spheres, or polytetrafluoroethylene. Embodiment 16 is The polymeric composite material of any one of embodiments 1 to 15, wherein the material is in the shape of a film. Embodiment 17 is the polymeric composite material of any one of embodiments 1 to 16, wherein the material is in the shape of a fiber. Embodiment 18 is the polymeric composite material of embodiment 17, wherein the fiber is a melt-spun fiber, a dry spun fiber, or a wet-spun fiber.

Embodiment 19 is the polymeric composite material of any one of embodiments 1 to 18, comprised in an article of manufacture. Embodiment 20 is the polymeric composite material of embodiment 19, wherein the article of manufacture is a film, monolith, wafer, blanket, core composite material, a substrate for radiofrequency antenna, substrate for a sunshield, a substrate for a sunshade, a substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, a storage container, a pipe, a tube, a seal, a gasket, aqueous filtration apparatus, oil-based filtration apparatus, and solvent-based filtration apparatus, or any combination thereof. Embodiment 21 is the polymeric composite material of any one of embodiments 19 to 20, wherein the article of manufacture is an injection molded or blow molded article of manufacture.

Embodiment 22 is a method of making the polymeric composite material of any one of embodiments 1 to 18, the method comprising dispersing the plurality of polymeric aerogel particles into a polymeric composition to form the polymeric composite material of any one of embodiments 1 to 17. Embodiment 23 is the method of embodiment 22, wherein the polymeric aerogel particles are dispersed into the polymeric composition through casting, melt blending, or extruding the particles with the polymeric composition. Embodiment 24 is a method for changing the viscosity of a polymeric composition, the method comprising dispersing a sufficient amount of a plurality of polymeric aerogel particles within the polymeric composition to change the viscosity of the polymeric composition when compared with the same polymeric composition that does not include the plurality of polymeric aerogel particles. Embodiment 25 is the method of embodiment 24, wherein the viscosity of the polymeric composition is reduced when compared with the same polymeric composition that does not include the plurality of polymeric aerogel particles. Embodiment 26 is the method of embodiment 25, wherein the viscosity of the polymeric composition is increased when compared with the same polymeric composition that does not include the plurality of polymeric aerogel particles.

Embodiment 27 is a method for delaying the onset and/or reducing the peak exotherm during curing of a thermoset polymer, the method comprising dispersing a sufficient amount of a plurality of polymeric aerogel particles within the polymeric thermoset composition to delay and/or reduce the peak exotherm of the polymeric thermoset composition when compared with the same polymeric thermoset composition that does not include the plurality of polymeric aerogel particles. Embodiment 28 is the method of embodiment 27, wherein the onset exotherm is delayed by 0.25 hours to 2 hours, preferably 0.3 hours to 0.75 hours. Embodiment 29 is the method of any one of embodiments 27 to 28, wherein the peak exotherm is reduced by 5 to 50° C., preferably 10 to 30° C., more preferably 15 to 25° C.

Embodiment 30 is a method for increasing the heat deflection temperature (HDT) of a polymeric composition, the method comprising dispersing a sufficient amount of a plurality of polymeric aerogel particles within the polymeric composition to change, preferably increase, the HDT of the polymeric composition when compared with the same polymeric composition that does not include the plurality of polymeric aerogel particles. Embodiment 31 is the method of embodiment 30, wherein the amount of the plurality of polymeric aerogel particles is from 1 wt. % to 50 wt. %, preferably 5 wt. % to 40 wt. %, or 10 wt. % to 20 wt. %. Embodiment 32 is the method of any one of embodiments 30 to 31, wherein the aerogel particle size is 10 micrometers to 150 micrometers, preferably 30 micrometers to 125 micrometers. Embodiment 33 is the method of any one of embodiments 30 to 32, wherein the HDT of the polymeric composite material is at least 15%, at least 20%, at least 25%, at least 30%, at least 35%, at least 40%, at least 45%, or at least 50% lower, when compared with the same native polymeric composite material.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions of the invention can be used to achieve methods of the invention.

The following includes definitions of various terms and phrases used throughout this specification.

The term "aerogel" refers to a class of materials that are generally produced by forming a gel, removing a mobile interstitial solvent phase from the pores, and then replacing it with a gas or gas-like material. By controlling the gel and evaporation system, density, shrinkage, and pore collapse can be minimized. As explained above, aerogels of the present invention can include micropores and/or mesopores or any combination thereof. The amount of micropores and/or mesopores in any given aerogel of the present invention can be modified or tuned as desired. In certain preferred aspects, however, the aerogels can include mesopores such that at least 5%, 10%, 15%, 20%, 25%, 30%, 35%, 40%, 45%, 50%, 55%, 60%, 65%, 70%, 75%, 80%, 85%, 90%, 95%, or 100% of the aerogel's pore volume can be made up of mesopores. In some embodiments, the aerogels of the present invention can have low bulk densities (about 0.25 g/cm$^3$ or less, preferably about 0.01 to 0.5 g/cm$^3$), high surface areas (generally from about 10 to 1,000 m$^2$/g and higher, preferably about 50 to 1000 m$^2$/g), high porosity (about 80% and greater, preferably greater than about 85%), and/or relatively large pore volume (more than about 1.0 mL/g, preferably about 1.2 mL/g and higher).

The presence of mesopores and/or micropores in the aerogels of the present invention can be determined by mercury intrusion porosimetry (MIP) and/or gas physisorption experiments. In a preferred instance, the MIP test used in the Examples section can be used to measure the mesopores above 5 nm (i.e., American Standard Testing Method (ASTM) D4404-10, Standard Test Method for Determination of Pore Volume and Pore Volume Distribution of Soil and Rock by Mercury Intrusion Porosimetry). In a preferred instance, gas physisorption experiments are used in the Examples section can be used to measure mesopores and/or micropores (ASTM D1993-03(2008) Standard Test Method for Precipitated Silica—Surface Area by Multipoint BET Nitrogen).

The terms "impurity" or "impurities" refers to unwanted substances in a feed fluid that are different than a desired filtrate and/or are undesirable in a filtrate. In some instances, impurities can be solid, liquid, gas, or supercritical fluid. In some embodiments, an aerogel can remove some or all of an impurity.

The term "desired substance" or "desired substances" refers to wanted substances in a feed fluid that are different than the desired filtrate. In some instances, the desired substance can be solid, liquid, gas, or supercritical fluid. In some embodiments, an aerogel can remove some or all of a desired substance.

The term "radio frequency (RF)" refers to the region of the electromagnetic spectrum having wavelengths ranging from 10$^{-4}$ to 10$^7$ m.

The term "supercritical fluid" refers to any substance at a temperature and pressure above its critical point. A supercritical fluid can diffuse through solids like a gas, and dissolve materials like a liquid. Additionally, close to the critical point, small changes in pressure or temperature result in large changes in density.

An "aliphatic group" is an acyclic or cyclic, saturated or unsaturated carbon group, excluding aromatic compounds. A linear aliphatic group does not include tertiary or quaternary carbons. Aliphatic group substituents include, but are not limited to halogen, hydroxyl, alkoxyl, haloalkyl, haloalkyl, carboxylic acid, ester, amine, amide, nitrile, acyl, thiol and thioether. A branched aliphatic group includes at least one tertiary and/or quaternary carbon. Branched aliphatic group substituents can include alkyl, halogen, hydroxyl, alkoxyl, haloalkyl, haloalkoxy, carboxylic acid, ester, amine, amide, nitrile, acyl, thiol and thioether. A cyclic aliphatic group is includes at least one ring in its structure. Polycyclic aliphatic groups can include fused, e.g., decalin, and/or spiro, e.g., spiro[5.5]undecane, polycyclic groups. Cyclic aliphatic group substituents can include alkyl, halogen, hydroxyl, alkoxy, haloalkyl, haloalkoxy, carboxylic acid, ester, amine, amide, nitrile, acyl, thiol and thioether.

An "alkyl group" is linear or branched, substituted or unsubstituted, saturated hydrocarbon. Alkyl group substituents may include, but are not limited to alkyl, halogen, hydroxyl, alkoxy, haloalkyl, haloalkoxy, carboxylic acid, ester, amine, amide, nitrile, acyl, thiol and thioether.

An "aryl" or "aromatic" group is a substituted or unsubstituted, mono- or polycyclic hydrocarbon with alternating single and double bonds within each ring structure. Aryl group substituents can include alkyl, halogen, hydroxyl, alkoxy, haloalkyl, haloalkoxy, carboxylic acid, ester, amine, amide, nitrile, acyl, thiol and thioether.

The term "acrylate" includes substituted and unsubstituted vinyl carboxylic acids. A general structure of an acrylate is

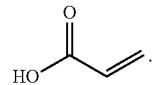

Non-limiting examples of acrylate include acrylate and methacrylate.

The term "acid" compound when used in context of producing unsaturated polyester material includes carboxylic acids, dicarboxylic acids and anhydride compounds.

The term "alkenyl group" refers to an unsaturated hydrocarbon (i.e., a double bond).

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polymeric composite materials of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the polymeric composite materials of the present invention are there thermal conductivity and textural properties.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

FIG. 2A is a filled high viscosity composite and FIG. 2B is a filled low viscosity composite.

FIG. 3A is a filled unsaturated orthophthalic polyester composite, FIG. 3B is a filled isophthalic polyester composite, and FIG. 3C is a filled vinyl ester styrene composite.

Figure 1:
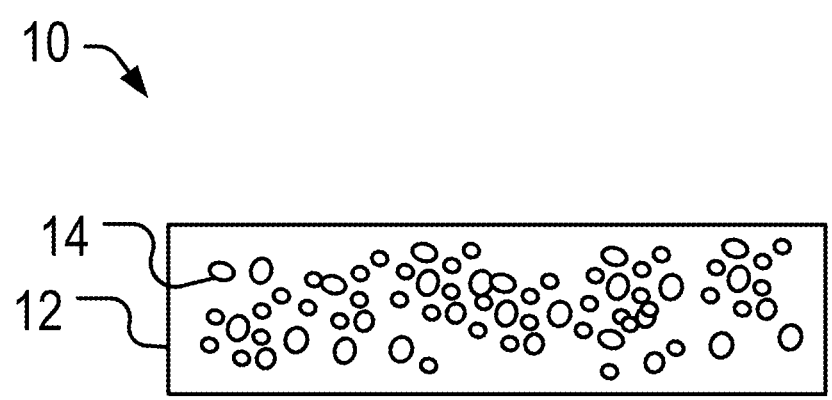
FIG. 1 is an illustration of an aerogel filled composite of the present invention.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a solution to some of the problems associated with insulation and textural properties associated with polymeric composite materials. The discovery is premised on a polymeric composite material that includes aerogel particles dispersed throughout the polymeric matrix. Notably, the polymeric composites have good mechanical and insulating properties. These and other non-limiting aspects of the present invention are discussed in further detail in the following sections.

These and other non-limiting aspects of the present invention are discussed in further detail in the following sections.

A. Polymeric Composite Material

The polymeric composite materials of the present invention include a continuous polymeric phase and a discontinuous phase dispersed throughout the continuous phase. The discontinuous phase can include aerogel particles. In some embodiments, the polymeric composite material can include one or more additives dispersed or solubilized within the continuous polymeric matrix. FIG. 1 shows an illustration of a polymeric composite of the present invention. Polymeric composite material 10 includes polymeric continuous phase 12 and discontinuous particle phase 14. The polymeric composite can be any shape or form. Non-limiting examples of forms include films, fibers, blocks, sheets, tubes, rolls, and the like. Fibers can include a melt-spun fiber, a dry spun fiber, or a wet-spun fiber. Films and sheets can be any thickness. The polymeric composite material can include 0.5 wt. % to 10 wt. %, or at least, equal to, or between any two of 0.5 wt. %, 1 wt. %, 1.5 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, and 10 wt. % of the plurality of polymeric aerogel particles, based on the total weight of the continuous polymeric matrix and the discontinuous phase. The polymeric composite material can include 2 vol. % to 80 vol. % or at least, equal to, or between any two of 2 vol. %, 5 vol. %, 10 vol. %, 15 vol. %, 20 vol. %, 25 vol. %, 30 vol. %, 35 vol. %, 40 vol. %, 45 vol. %, 50 vol. %, 55 vol. %, 60 vol. %, 65 vol. %, 70 vol. %, 75 vol. %, and 80 vol. % of the plurality of polymeric aerogel particles, based on the total volume of the continuous polymeric matrix and the discontinuous phase. The polymeric composite material can have physical and/or mechanical properties that are improved as compared to the native material. The thermal conductivity (W/m·K) of the polymeric composite material can be the same or decreased when compared with the same polymeric composite material that does not include the discontinuous phase that includes the plurality of polymeric aerogel particles. The composite polymeric material can have a thermal conductivity at least 5% lower than (e.g., less than 95% of) the thermal conductivity of the native thermoplastic polymer material. In particular embodiments, the composite material has a thermal conductivity at least 10%, at least 15%, at least 20%, at least 25%, at least 30%, at least 35%, at least 40%, at least 45%, or at least 50% lower than the native polymeric material. The dielectric constant of the polymeric composite material can be decreased when compared with the same polymeric composite material that does not include the discontinuous phase that includes the plurality of polymeric aerogel particles. The composite polymeric material can have a dielectric constant at least 5% lower than (e.g., less than 95% of) the dielectric constant of the native thermoplastic polymer material. In particular embodiments, the composite material has a dielectric constant at least 10%, at least 15%, at least 20%, at least 25%, at least 30%, at least 35%, at least 40%, at least 45%, or at least 50% lower than the native polymeric material. The compressive yield strength (MPa), compressive modulus strength (GPa), and/or yield strain (%) of the polymeric composite material can be the same or changed. For example, the compressive yield strength (MPa), compressive modulus strength (GPa), and/or yield strain (%) of the polymeric composite material can be less than, equal to (e.g., within 5%), or is increased when compared with the same polymeric composite material that does not include plurality of polymeric aerogel particles. The HDT of the polymeric composite material is at least 15%, at least 20%, at least 25%, at least 30%, at least 35%, at least 40%, at least 45%, or at least 50% lower, when compared with the same native polymeric composite material. In some embodiments, within the polymeric composition to change the viscosity of the polymeric composition when compared with the same polymeric composition that does not include the plurality of polymeric aerogel particles. In some embodiments, 1 wt. % to 50 wt. %, or at least, equal to, or between any two of 1 wt. %, 5 wt. %, 10 wt. %, 15 wt. %, 20 wt. %, 25 wt. %, 30 wt. %, 35 wt. %, 40 wt. %, 45 wt. % and 50 wt. % of a plurality of polymeric aerogel particles having a particle size of 10 to 15 micrometers, or at least, equal to, or between any two of 10, 25, 50, 75, 100, 125, and 150 micrometers can be added to the polymeric composition to effect the change in HDT and/or viscosity.

B. Materials

1. Polymeric Matrix

The polymeric matrix can include thermoplastic and/or thermoset polymers. The polymeric matrix can be produced using any known process for making polymers (e.g., gas phase, solution, emulsion, or melt processing and the like). Non-limiting examples of thermoplastic polymers include polyethylene terephthalate (PET), a polycarbonate (PC) family of polymers, polybutylene terephthalate (PBT), poly (1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethylmethacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, polyesters or derivatives thereof, polyamides or derivatives thereof (e.g., nylon), fluoropolymers or derivatives thereof, or blends thereof. Fluoropolymers can include, polytetrafluoroethylene (PTFE), perfluoroalkoxy (PFA), fluorinated ethylene-propylene polymer (FEP), ethylene tetrafluoroethylene copolymer (ETFE), ethylene-chorotrifluoroethylene copolymer (ECTFE), polychlorofluoroethylene (PCTFE), polyvinylidene fluoride (PVDF) and its copolymers (PVDF-TrFE, PVDF-TrFE-CFE), polyvinyl fluoride (PVF), tetrafluoroethylene-perfluoro-3,6-dioxa-4-methyl-7-octenesulfonic acid copolymer, or blends thereof. Polyamides can include all nylon type compounds. Non-limiting examples of nylon include polycaprolactam, poly[imino(1,6-dioxohexamethylene) iminohexamethylene], poly(dodecano-12-lactam), or any blend thereof.

Non-limiting examples of thermoset polymers include unsaturated polyester resins, polyurethanes, polyoxybenzylmethylenglycolanhydride (e.g., Bakelite), urea-formaldehyde, diallyl-phthalate, epoxy resin, epoxy vinylesters, polyimides, cyanate esters of polycyanurates, dicyclopentadiene, phenolics, benzoxazines, polysiloxanes (e.g., silicones and silicone rubber), natural rubber, polyisoprene, polychloroprene, styrene butadiene rubber, nitrile butadiene rubber, ethylene propylene diene monomer rubber (EPDM), butyl rubber (IIR), polybutadiene (BR), epichlorohydrin (ECO), fluorinated hydrocarbon (FKM), co-polymers thereof, or blends thereof. Polyimides can also have pseudothermoplastic properties. Unsaturated polyesters can be made using known polycondensation reactions. The unsaturated polyester of the present invention can be formed from acid compounds, diols, alkenyls (e.g., dicyclopentadiene), or obtained from commercial vendors. Non-limiting examples of acid compounds can include isophthalic acid terephthalic acid, adipic acid, tetrachlorophthalic anhydride and tetrabromophthalic anhydride, phthalic anhydride, maleic anhydride, maleic acid, fumaric acid, or mixtures thereof. Non-limiting examples of diol compounds can include 1,3-propanediol, 1,4-butanediol, 2-methyl-1,3-propanediol, dibromoneopentyl glycol, tetrabromo bisphenol-A, propylene glycol, ethylene glycol, diethylene glycol, dipropylene glycol, neopentyl glycol or blends thereof, or mixtures thereof. In some embodiments, the unsaturated polyester can have the general formula of:

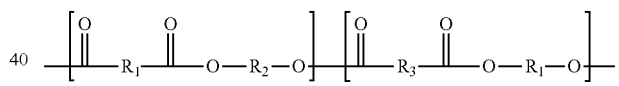

where $R_1$ can be derived from an acid moiety, $R_2$ can be derived from a diol, and $R_3$ can an alkenyl moiety. $R_3$ can be formed from an anhydride (e.g., maleic anhydride). $R_3$ can be capable of reacting with the compound having an alkenyl group to form a cross-linked polyester material. Unsaturated polyesters can be provided as a solution containing the unsaturated polyester and an alkenyl compound (e.g., styrene or dicyclopentadiene). Unsaturated polyester resins are also commercially available from, for example, Revchem Composites, Inc. (Stockton, CA, USA).

2. Aerogels

The aerogel particles can include organic aerogels. Organic aerogels can be made from polyacrylates, polystyrenes, polyacrylonitriles, polyurethanes, polyimides, polyamides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, polyesters, cross-lined polyesters, polystyrene, silicones, various epoxies, agar, agarose, lignin, cellulose, and the like. Organic aerogels can be obtained from Blueshift materials, Inc., USA. In particular embodiments the aerogel is a polyimide aerogel. Polyimide-based aerogels can be obtained from commercial vendors (e.g., Blueshift Materials, Inc., USA under the trade name AeroZero®) or made using known aerogel methodology. Aerogels can be made using the methodology described in International Patent Application Publication Nos. WO 2014/189560 to Rodman et al., 2017/07888 to Sakaguchi et al., 2018/078512 to Yang et al. 2018/140804 to Sakaguchi et al., 2019/006184 to Irvin et al., International Patent Application No. PCT/US2019/029191 to Ejaz et al., U.S. Patent Application Publication No. 2017/0121483 to Poe et al., and U.S. Pat. No. 9,963,571 to Sakaguchi et al., all of which are incorporated herein by reference in their entirety. The aerogel particles can be any size. In some embodiments, the aerogel particle size can be 5 µm to 500 µm, or at least, equal to, or between any two of 5, 10 20, 30, 40, 50, 60, 70, 80, 90, 100, 150, 200, 250, 300, 350, 400, 450 and 500 µm. In some embodiments, the particle size distribution can be multi-modal (e.g., bimodal, trimodal, etc.). In certain embodiments, the particle size distribution is bimodal with one mode being between 10 and 100 µm and the other mode being between 150 and 300 µm. The aerogel particles can be formed by making an aerogel film or shape and then reducing the film or shape to particles. For example, the films and/or shapes can be milled, chopped, or machined into particles.

3 Additives

The polymeric composite material can include additives. The additives can be dispersed or solubilized in the continuous phase (i.e., polymeric matrix). Additives can include an inorganic additives and organic additives. Inorganic additives include glass particles, glass fibers, glass spheres, hollow glass spheres, and ceramic spheres. Organic additives include polytetrafluoroethylene, an anti-fogging agent, an antioxidant, a heat stabilizer, a light stabilizer, a hindered amine light stabilizer, a flow modifier, an UV absorber, an impact modifier, a coupling agent, a colorant, etc., or any combinations thereof. The amount of additives in the polymeric matrix between 0 and 20 wt. %, or at least, equal to, or between any two of 0, 1, 2, 3, 4, 5, 6, 7, 8, 9, 10, 11, 12, 13, 14, 15, 16, 17, 18, 19, and 20 wt. % based on the total weight of the polymeric matrix.

D. Method of Making the Polymeric Composite Material

The polymeric aerogel particles can be dispersed in the polymeric matrix using dry or wet blending techniques. Non-limiting examples of dispersion processes include casting, melt blending, or extruding the particles with the polymeric composition. In some embodiments, the polymeric matrix material (e.g., a pure thermoset polymer, and/or a polymer mixture) can be dry mixed with aerogel particles, forming a dry blend. In another embodiment, the polymeric matrix can be premixed and pelletized prior to being dry mixed with polymeric aerogel particles. The dry blend can be melt-extruded, preferably in a twin screw extruder, such as a conical twin-screw extruder with adjustable temperature zones, or solution processed resulting in an organic/inorganic composite. In another embodiment, the polymeric aerogel particles can be mixed with the polymeric matrix using melt extrusion. In yet another embodiment, the polymeric aerogel particles can be mixed with the polymer material dissolving the polymer material in a solvent and then adding the aerogel particles to the solution. Dissolving the polymer enables the composite material to be wet spun into fibers or cast into sheets. The polymeric composite material can then be melt-spun into fibers, extruded into tapes, injection molded, blow molded, and/or compression molded into any usable shape or form. The temperatures for the process to make the composite material can vary depending on the type of polymeric matrix used. Temperatures can range from 15° C. to 200° C. or any range or value there between. During curing, the addition of aerogel particles can delay the exotherm by 0.25 hours to 2 hours, preferably 0.3 hours to 0.75 hours. In other embodiments, the onset exotherm can be reduced by 5 to 50° C. or at least, equal to, or between any two of 5° C., 10° C., 15° C., 20° C., 25° C., 30° C., 35° C., 40° C., 45° C., 50° C., or by 10% to 85%, or at least, equal to, or between any two of 10%, 20%, 30%, 40%, 50%, 60%, 70%, 80% and 85%.

E. Articles of Manufacture Incorporating the Polymeric Composite Materials

In some aspects, an article of manufacture can include any one of the polymeric composite materials of the present invention. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, a storage container, a pipe, a tube, a seal, a gasket, aqueous filtration applications, oil-based filtration applications, and solvent-based filtration applications.

1. Fluid Filtration Applications

In some embodiments, the polymeric composite materials of the present invention can be used in fluid filtration systems and apparatus. In such applications, the polymeric composite materials can be permeable to the fluid being filtered. A feed fluid can be contacted with the polymeric composite materials such that all or, substantially all, of the impurities and/or desired substances are removed from the feed fluid to produce a filtrate essentially devoid of the impurities and/or desired substances. The filtrate, impurities, and/or desired substances can be collected, stored, transported, recycled, or further processed. The polymeric composite materials can be further processed to release the impurities and/or desired substances from the polymeric composite materials.

The polymeric composite materials of the present invention can be used in or with filtration apparatuses known in the art. Non-limiting examples of filtration apparatuses and applications include gas filters such as, but not limited to, building air filters, automotive cabin air filters, combustion engine air filters, aircraft air filters, satellite air filters, face mask filters, diesel particulate filters, in-line gas filters, cylinder gas filters, soot filters, pressure swing absorption apparatus, etc. Additional non-limiting examples of filtration apparatuses and applications include solvent filtration systems, column filtration, chromatography filtration, vacuum flask filtration, microfiltration, ultrafiltration, reverse osmosis filtration, nanofiltration, centrifugal filtration, gravity filtration, cross flow filtration, dialysis, hemofiltration, hydraulic oil filtration, automotive oil filtration, etc. Further, non-limiting examples of the purpose of filtration includes sterilization, separation, purification, isolation, etc.

A fluid for filtration ("feed") and a filtrate can be any fluid. The fluid can be a liquid, gas, supercritical fluid, or mixture thereof. In some instances, the fluid can be aqueous, organic, non-organic, biological in origin, or a mixture thereof. In some instances, the fluid can contain solids and/or other fluids. As non-limiting examples, the fluid can be or can be partially water, blood, an oil, a solvent, air, or mixtures thereof. Water can include water, any form of steam and supercritical water.

In some instances, the fluid can contain impurities. Non-limiting examples of impurities include solids, liquids, gases, supercritical fluids, objects, compounds, and/or chemicals, etc. What is defined as an impurity may be different for the same feed fluid depending on the filtrate desired. In some embodiments, one or more polymeric composite materials can be used to remove impurities. Non-limiting examples of impurities in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, defoamants, chelating agents, microorganisms, particulate matter, etc. Non-limiting examples of impurities in blood can include red blood cells, white blood cells, antibodies, microorganisms, water, urea, potassium, phosphorus, gases, particulate matter, etc. Non-limiting examples of impurities in oil can include water, particulate matter, heavy and/or light weight hydrocarbons, metals, sulfur, defoamants, etc. Non-limiting examples of impurities in solvents can include water, particulate matter, metals, gases, etc. Non-limiting impurities in air can include water, particulate matter, microorganisms, liquids, carbon monoxide, sulfur dioxide, etc.

In some instances, the feed fluid can contain desired substances. Non-limiting examples of desired substances include solids, liquids, gases, supercritical fluids, objects, compounds, and/or chemicals, etc. In some embodiments, one or more polymeric composite materials can be used to concentrate or capture a desired substance, or remove a fluid from a desired substance. Non-limiting examples of desired substances in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, chelating agents, defoamants, etc. Non-limiting examples of desired substances in blood can include red blood cells, white blood cells, antibodies, lipids, proteins, etc. Non-limiting examples of desired substances in oil can include hydrocarbons of a range of molecular weights, gases, metals, etc. Non-limiting examples of desired substances in solvents can include particulate matter, fluids, gases, proteins, lipids, etc. Non-limiting examples of desired substances in air can include water, fluids, gases, particulate matter, etc.

A system for filtration can include a separation zone. The materials, size, and shape of the separation zone can be determined using standard engineering practice to achieve the desired flow rates and contact time. The Separation zone can be capable of holding or may be made of one or more polymeric composite materials of the present invention. In some instances, the separation zone is made entirely of one or more polymeric composite materials or one or more polymeric composite materials in or around a supporting structure. A feed fluid can be introduced to separation zone through an inlet or through direct contact with the separation zone. In some embodiments, the feed fluid can be received under greater or reduced pressure than ambient pressure. Introduction of the feed fluid into the separation zone can be at a rate sufficient to allow optimum contact of the feed fluid with the one or more polymeric composite materials. Contact of the feed fluid with the polymeric composite materials can allow the feed fluid to be filtered by the polymeric composite materials, which results in a filtrate having have less impurity and/or desired substance when compared with the feed fluid. In certain aspects, the filtrate can be essentially free of the impurity and/or the desired substance. The filtrate can exit the separation zone 602 via an outlet or through directly exiting the separation zone 602. In some instances, the filtrate can be recycled back to a separation zone, collected, stored in a storage unit, etc. In some instances, one or more polymeric composite materials can be removed and/or replaced from the separation zone. In some instances, the filtrate can be collected and/or removed from the separation zone without flowing through the outlet. In some instances, the impurities and/or desired substance can be removed from the separation zone. As one non-limiting example, the impurities and/or desired substances can be removed from the separation zone by flowing a fluid through the separation zone in the reverse direction from the flow of the feed fluid through the separation zone.

The filtration conditions in the separation zone can be varied to achieve a desired result (e.g., removal of substantially all of the impurities and/or desired substance from the feed fluid). The filtration conditions include temperature, pressure, fluid feed flow, filtrate flow, or any combination thereof. Filtration conditions are controlled, in some instances, to produce streams with specific properties. The separation zone can also include valves, thermocouples, controllers (automated or manual controllers), computers or any other equipment deemed necessary to control or operate the separation zone. The feed fluid flow can be adjusted and controlled to maintain optimum contact of the feed fluid with the one or more polymeric composite materials. In some embodiments, computer simulations can be used to determine flow rates for separation zones of various dimensions and various polymeric composite materials.

The compatibility of a polymeric composite material with a fluid and/or filtration application can be determined by methods known in the art. Some properties of polymeric composite materials that may be determined to assess the compatibility of the polymeric composite materials may include, but is not limited to: the temperature and/or pressures that the polymeric composite materials melts, dissolves, oxidizes, reacts, degrades, or breaks; the solubility of the polymeric composite materials in the material that will contact the polymeric composite materials; the flow rate of the fluid through the polymeric composite materials; the retention rate of the impurity and/or desired product form the feed fluid; etc.

2. Radiofrequency (RF) Applications

Due to their low density, mechanical robustness, light weight, and low dielectric properties, the polymeric composite materials of the present invention can be used in radiofrequency (RF) applications. The use of macroporous polymeric composite materials in RF applications enables the design of thinner substrates, lighter weight substrates and smaller substrates. Non-limiting examples of radiofrequency applications include a substrate for a RF antenna, a sunshield for a RF antenna, a radome, or the like. Antennas can include flexible and/or rigid antennas, broadband planar circuited antennas (e.g., a patch antennas, an e-shaped wideband patch antenna, an elliptically polarized circular patch antenna, a monopole antenna, a planar antenna with circular slots, a bow-tie antenna, an inverted-F antenna and the like). In the antenna design, the circuitry can be attached to a substrate that includes the polymeric composite materials and/or a combination of the polymeric composite materials and other components such as other polymeric materials. The use of polymeric composite materials in antennas enables the design substrates with higher throughput. In addition, the polymeric composite materials can have coefficient of linear thermal expansion (CTE) similar to aluminum and copper (e.g., CTE of 23/K and 17 ppm/K), and is tunable through choice of monomer to match CTE of other desirable materials. In some embodiments, the polymeric composite materials can be used in sunshields and/or sunscreens used to protect RF antennas from thermal cycles due to their temperature insensitivity and RF transparency. In certain embodiments, the polymeric composite materials can be used as a material in a radome application. A radome is a structural, weatherproof enclosure that protects a microwave (e.g., radar) antenna. The polymeric composite materials can minimize signal loss due to their low dielectric constant and also provide structural integrity due to their stiffness.

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Preparation of Polymeric Composite Materials

General Procedure. Filled thermoset resin samples are composites of epoxy or polyester resins loaded with AeroZero® (Blueshift Materials, USA) microparticles. AeroZero microparticle powder was mixed with liquid mixtures of resin by hand prior to the addition of curing catalyst. The catalyzed thermoset resin mixtures were poured into 12 inch square molds at ¼ inch thickness and cured at room temperature. Cured composites were subject to post-curing for 2 hours at 125° C. under vacuum.

Figures 2A, 2B:
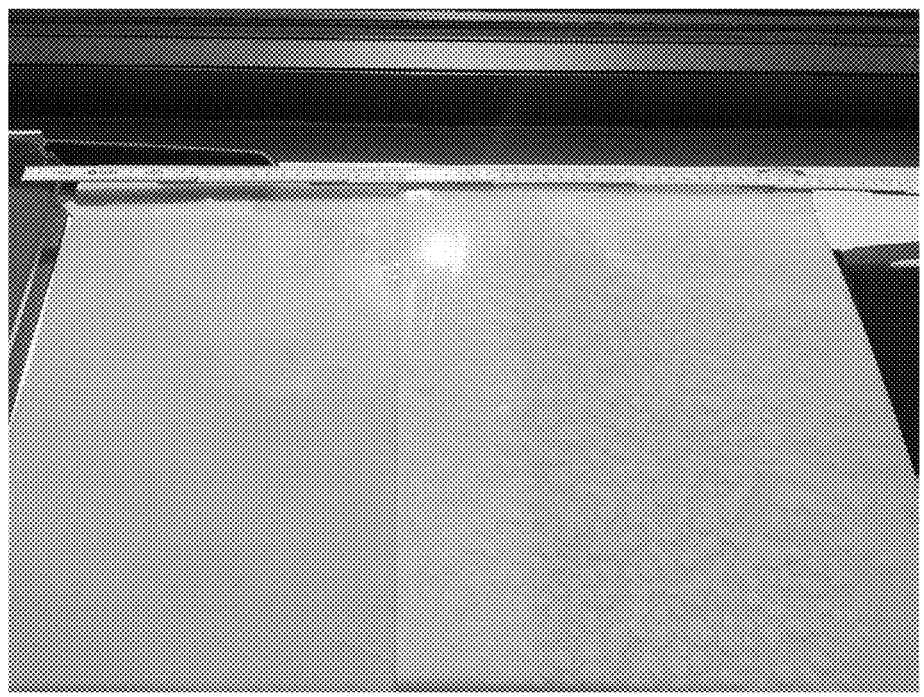
FIGS. 2A and 2B are images of aerogel filled epoxy composites of the present invention.

Epoxy composites: Two epoxy samples (high viscosity and low viscosity sold under the tradenames Tarbender™ EpoxAcast™ by Smooth-on, Inc., USA) having 30 μm AeroZero particles (10% v/v) were fabricated and tested for thermal and mechanical properties. These materials are shown in FIGS. 2A (high viscosity) and 2B (low viscosity).

Figures 3A, 3B, 3C:
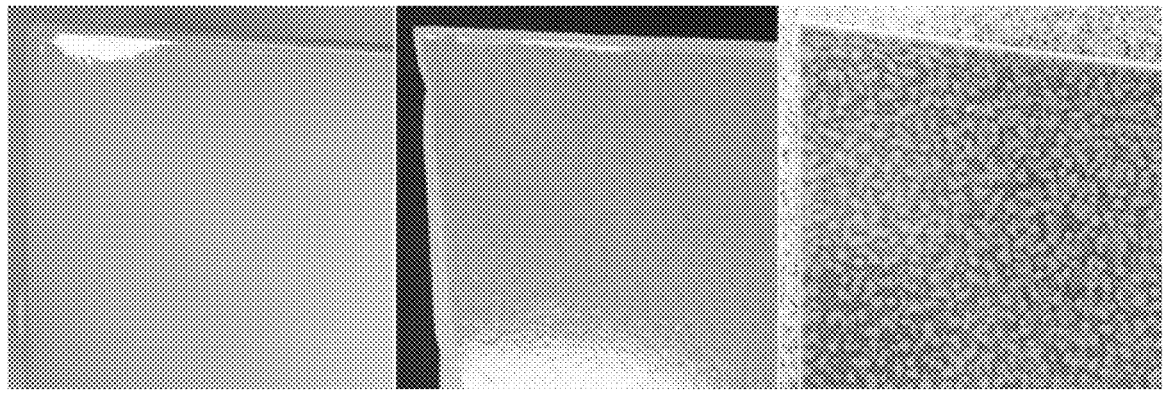
FIGS. 3A-3C are images of aerogel filled polyester composites of the present invention.

Polyester composites: Four filled polyester materials were made and tested for thermal and mechanical properties. These materials were These materials were Isophthalic Marine Resin (Iso), Orthophthalic Resin—30SS41-G (Ortho A), Orthophthalic Resin—30SS40-G (Ortho B), (Interplastic Corp., St. USA) and Hydrex 100 33350-99 (Reichhold, USA). Representative examples of these materials are shown in FIGS. 3A-3C with the amounts of AeroZero and particle size used listed in Table 1.

TABLE 1

| Polyester Iso | Polyester Hydrex | Polyester Ortho A | Polyester Ortho B |
|---|---|---|---|
| 30 μm 10% v/v (FIG. 3B) | 30 μm 10% v/v (FIG. 3C) | 30 μm 10% v/v | 30% v/v (FIG. 3A) |
| | | 125 μm 10% v/v | |
| | | 125 μm 25% v/v | |
| | | 125 μm 50% v/v | |

Figure 4:
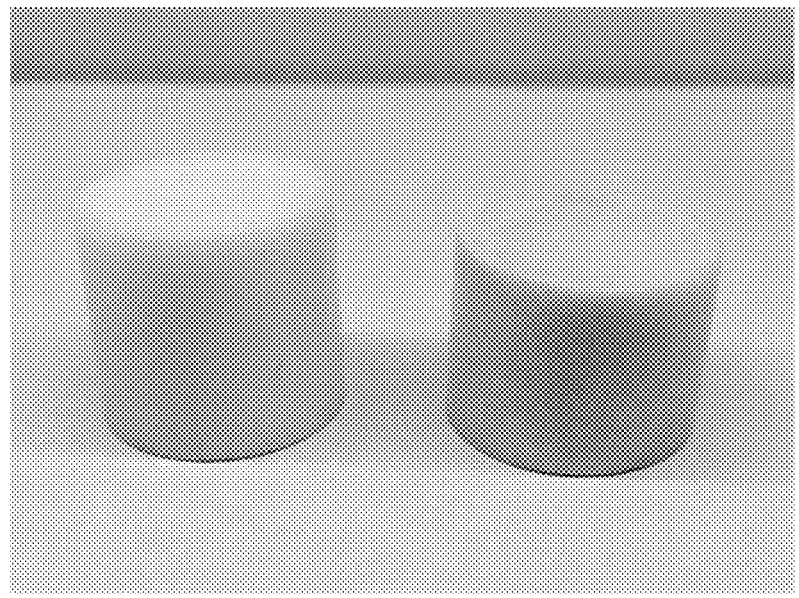
FIG. 4 is an image of aerogel filled nylon composites of the present invention (1 cm in diameter).
Figure 5:
FIG. 5 is an image of (left) an extruded AeroZero® microparticle filled nylon-6 composite film of the present invention and (right) a comparative extruded unfilled nylon-6 composite film.
Figure 6:
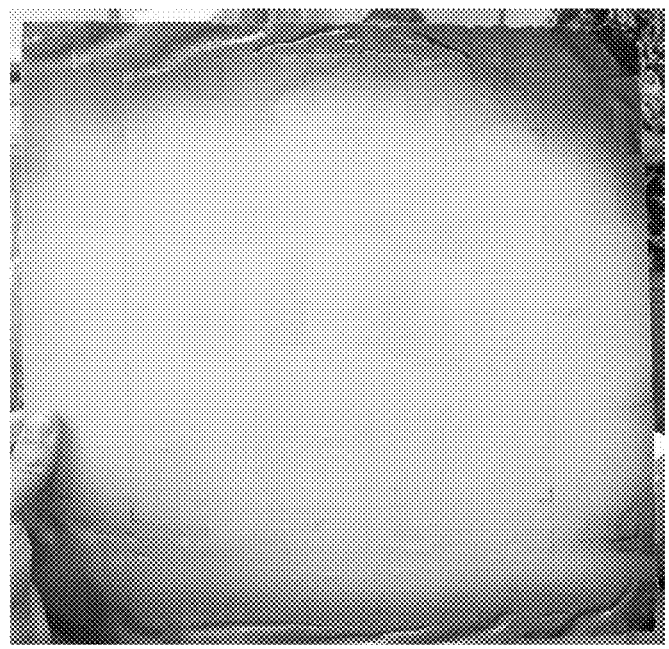
FIG. 6 is an image of an AeroZero® microparticle filled nylon-6 composite prior to cutting.

Nylon: The nylon samples were made by the anionic polymerization of ε-caprolactam in glass molds. The basic formula was caprolactam (80 wt. %), sodium caprolactamate (18 wt. %, and catalyst (2 wt. % BRUGGOLEN® C20P, Brüggermann Chemical, Germany). The components were heated to 140° C. and blended by stirring. In the case of the AeroZero filled nylon 6, AeroZero powder (10 wt. %) was added after melting the components. In both cases, the nylon polymerized after ~10 minutes at 140° C., yielding solid cylinders. FIG. 4 is an image of polyimide aerogel nylon composite stock shapes. FIG. 5 is an image of nylon-6 films with left: 10% v/v/AeroZero® microparticles and right: unfilled nylon-6. FIG. 6 is an image of a nylon-6 stock shape filled with AeroZero® microparticles prior to cutting.

Example 2

Textural Properties of Example 1 Samples and Comparative Unfilled Samples

Figure 7:
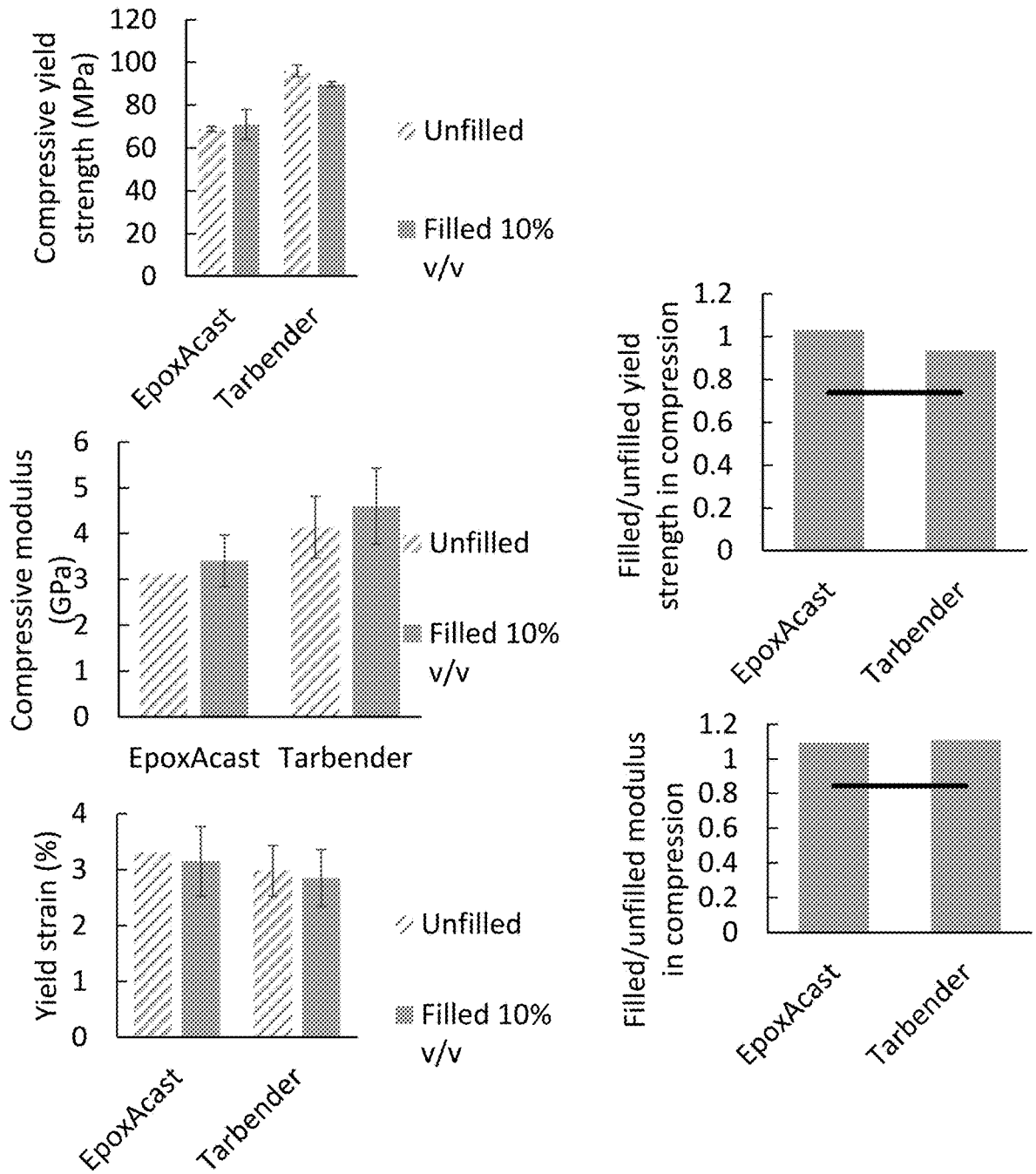
FIG. 7 is compression data for filled epoxy composites of the present invention and comparative unfilled epoxy composites.
Figure 8:
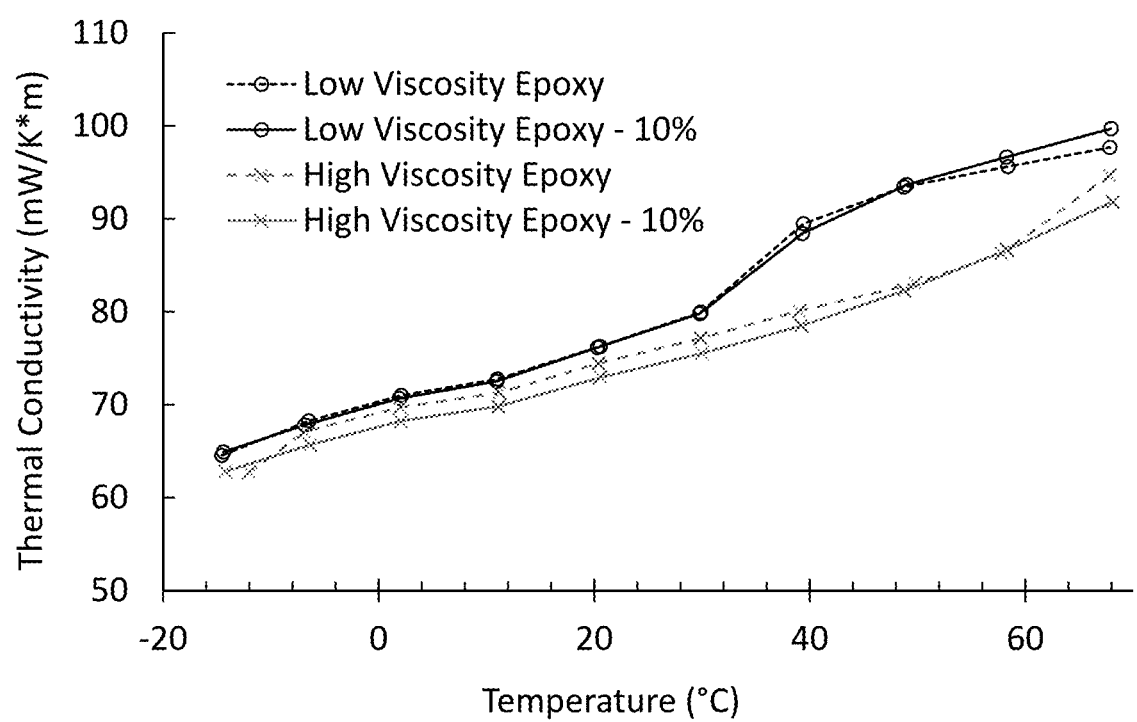
FIG. 8 is thermal conductivity for filled epoxy composites of the present invention and comparative unfilled epoxy composites.
Figure 9:
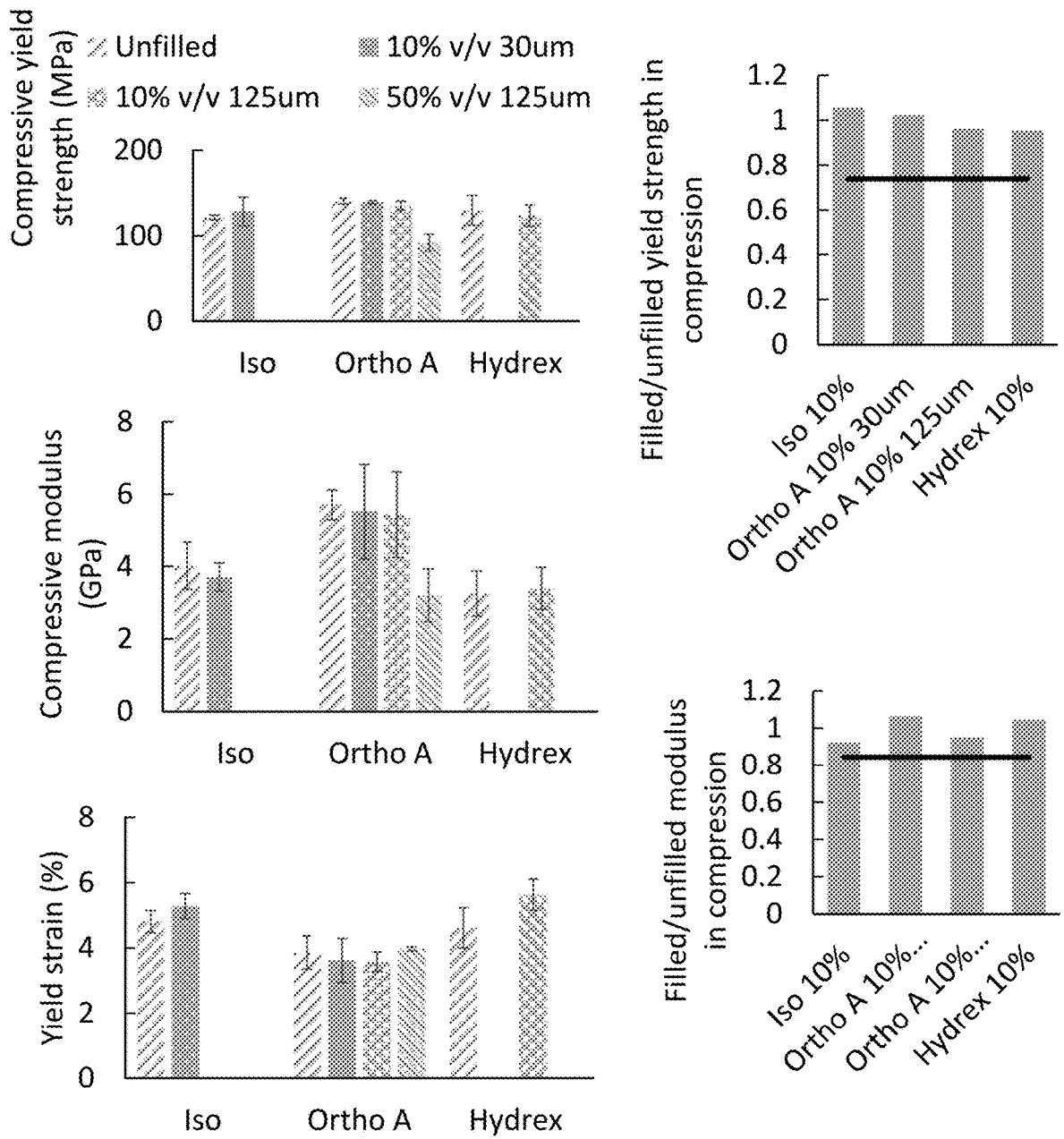
FIG. 9 is compression data for filled polyester composites of the present invention and comparative unfilled polyester composites.
Figure 10:
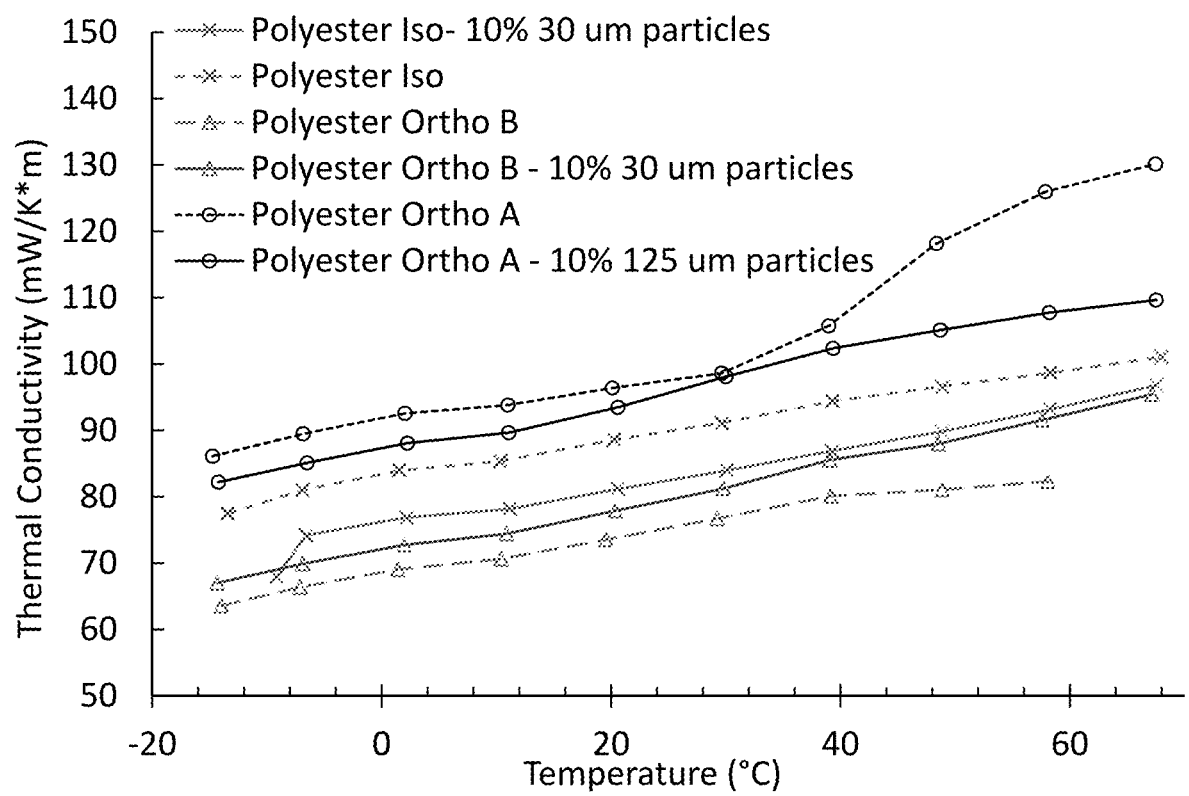
FIG. 10 is thermal conductivity for filled polyester composites of the present invention and comparative unfilled polyester composites.
Figure 11:
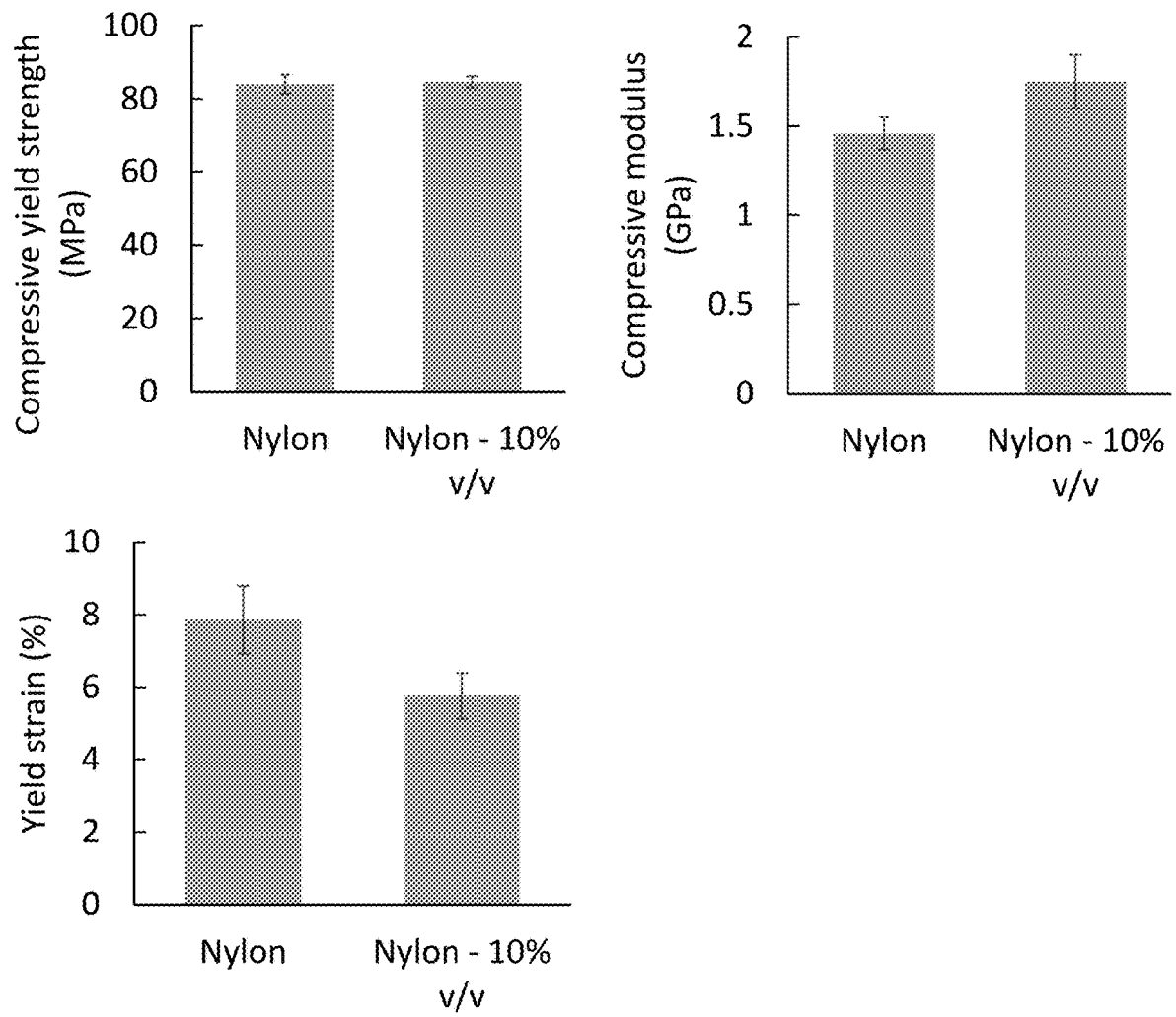
FIG. 11 is compression data for filled nylon-6 composites of the present invention and comparative unfilled nylon-6 composites.
Figure 12:
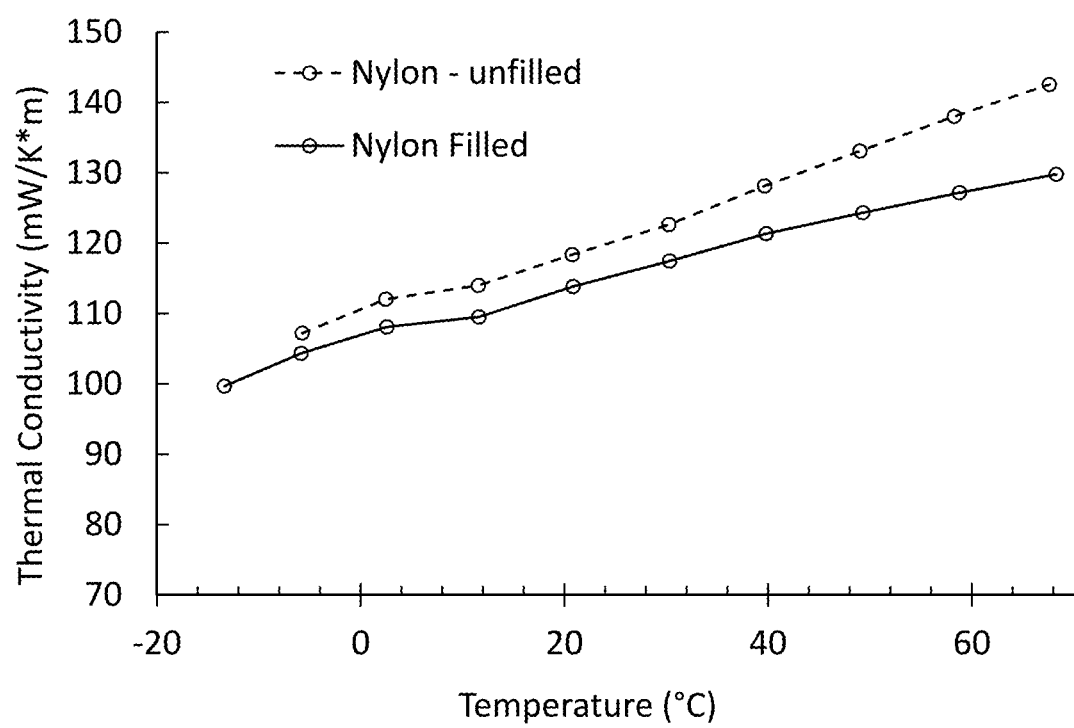
FIG. 12 is thermal conductivity for filled nylon-6 composites of the present invention and comparative unfilled nylon-6 composites.

FIG. 7 shows graphical representations of compressive yield strength (MPa), compressive modulus (GPa), % yield strain, filled modulus/unfilled modulus in compression, and filled resin yield strength/unfilled resin yield strength in compression for filled (10% v/v) and unfilled epoxy resins, obtained by following ASTM D695-15. The horizontal black line represent values predicted by finite element analysis models assuming that the AeroZero particles were perfect spheres with no bonding to the resin. FIG. 8 depicts the thermal conductivity data for filled and unfilled epoxy composites obtained by following ASTM D695-15. Unfilled samples are represented by dashed lines. FIG. 9 shows graphical representations of compressive yield strength (MPa), compressive modulus (GPa), % yield strain, filled modulus/unfilled modulus in compression, and filled resin yield strength/unfilled resin yield strength in compression for filled (10% v/v) and unfilled polyester resins. The horizontal black line represent values predicted by finite element analysis models assuming that the AeroZero particles were perfect spheres with no bonding to the resin. FIG. 10 depicts the thermal conductivity data for filled and unfilled polyester materials obtained via ASTM C518-17. Unfilled samples are represented by dashed lines. FIG. 11 depicts compression data for melt pressed filled and unfilled nylon obtained by following ASTM D695-15. FIG. 12 depicts the thermal conductivity data for filled and unfilled nylon-6 obtained via ASTM C518-17.

Example 3

Reduction of Peak Exotherm

Figure 13:
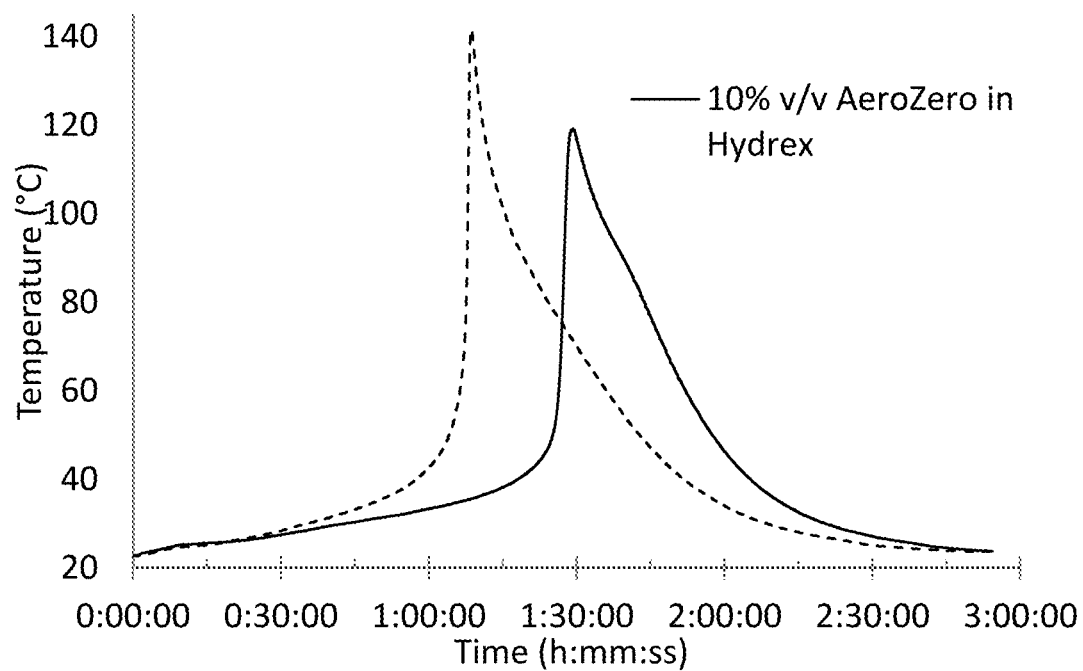
FIG. 13 shows reduction and delay of onset peak exotherm during curing for a polyester containing 10% v/v/ of aerogel particles vs. unfilled the same polyester absent the aerogel particles.

Reduction and delay of onset of peak exotherm. 100 mL Hydrex resin, described in Example 1, was mixed with AeroZero microparticles at 20% v/v loading by hand. The catalyst MEKP was added to this Hydrex/AeroZero mixture and a separate 100 mL of neat Hydrex resin at 2% v/v and stirred by hand for one minute. These mixtures were simultaneously poured into beakers affixed with thermocouples and the temperature of the mixtures was recorded at 1 second intervals for 3 hours. The resulting exotherm data are shown in FIG. 13. Unfilled Hydrex had a peak exotherm of 141.6° C. occurring 69 minutes after the addition of the catalyst. In comparison, Hydrex resin with a 10% v/v loading of AeroZero microparticles had a 20-minute delay in peak exotherm, which was reduced by 22.5° C. (reaching 119.1° C.).

Example 4

Increase of HDT in Composites

Figure 14:
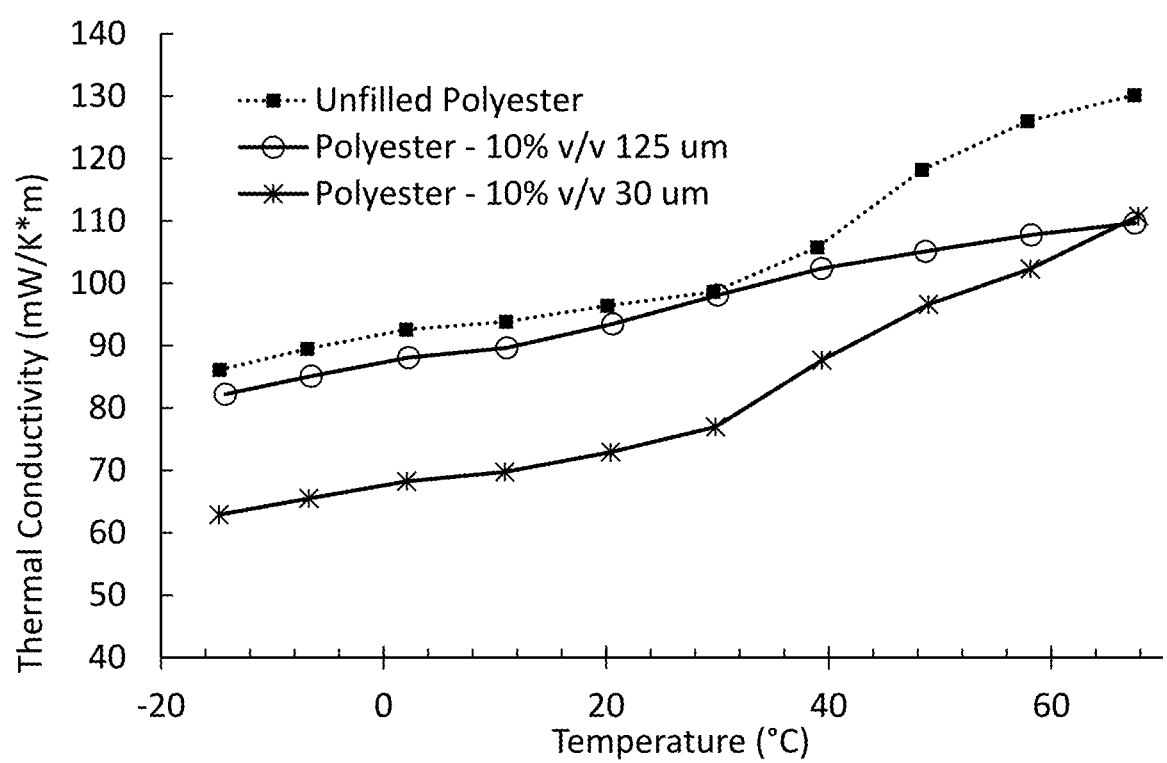
FIG. 14 shows thermal conductivity data over temperature for unfilled polyester absent aerogel particles, the same polyester containing 10% v/v of 125 micrometer aerogel particles, and the same polyester containing 10% v/v of 30 micrometer aerogel particles.

The 10% v/v Ortho A composites prepared in Example 1 exhibited different thermal conductivity trends depending on the size of the AeroZero microparticles comprised in the composite. FIG. 14 shows the heat deflection temperature (HDT), evidenced by the inflection point at about 40° C. in unfilled and 30 um-filled samples does not appear within the tested range of temperatures in the 125 um-filled samples. From the data, it was determined that the larger particles provided sufficient structural support to counteract the effects of the HDT, or said another way the HDT was higher in samples with larger particles. The HDT represents the temperature at which the mechanical properties of a material become compromised, and thus an increased HDT indicates the AeroZero particles offer structural support as well as insulating properties.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polymeric composite material comprising:
  a continuous polymeric matrix comprising a thermoset polymer or a blend of thermoset polymers, wherein the thermoset polymer or blend of thermoset polymers include polyester, epoxy, or nylon; and
  a discontinuous phase comprising a plurality of polymeric aerogel particles dispersed within the continuous polymeric matrix, wherein the plurality of aerogel particles are polyimide aerogel particles,
  wherein polyimide from the plurality of polymeric aerogel particles is in direct contact with the continuous polymeric matrix,
  wherein the thermal conductivity (W/m·K) of the polymeric composite material is lower when compared with the same polymeric composite material that does not include the discontinuous phase comprising the plurality of polymeric aerogel particles, and
  wherein the dielectric constant of the polymeric composite material is decreased when compared with the same polymeric composite material that does not include the discontinuous phase comprising the plurality of polymeric aerogel particles.

2. The polymeric composite material of claim 1, wherein the plurality of polymeric aerogel particles dispersed within the continuous polymeric matrix have an average size of 5 µm to 500 µm.

3. The polymeric composite material of claim 1, wherein the plurality of polymeric aerogel particles dispersed within the continuous polymeric matrix have a bimodal particle size distribution.

4. The polymeric composite material of claim 1, wherein the polymeric composite material comprises 0.5 wt. % to 10 wt. % of the plurality of polymeric aerogel particles, based on the total weight of the continuous polymeric matrix and the discontinuous phase.

5. The polymeric composite material of claim 1, wherein the polymeric composite material comprises 2 vol. % to 80 vol. % of the plurality of polymeric aerogel particles, based on the total volume of the continuous polymeric matrix and the discontinuous phase.

6. The polymeric composite material of claim 1, wherein the compressive yield strength (MPa), compressive modulus strength (GPa), and/or yield strain (%) of the polymeric composite material is the same or changed as compared to the same polymeric composite material that does not include the discontinuous phase comprising the plurality of polymeric aerogel particles.

7. The polymeric composite material of claim 1, wherein the continuous polymeric matrix does not comprise a thermoplastic polymer or a blend of thermoplastic polymers.

8. The polymeric composite material of claim 1, wherein the thermoset polymer is polyester.

9. The polymeric composite material of claim 8, wherein the polyester comprises a dicyclopentadiene modified polyester, an isophthalic based polyester, an orthophthalic based polyester, or a blend thereof.

10. The polymeric composite material of claim 9, wherein the polymeric composite material comprises an additive that is dispersed or solubilized within the continuous polymeric matrix, wherein the additive is glass particles, glass fibers, glass spheres, hollow glass spheres, ceramic spheres, or polytetrafluoroethylene.

11. The polymeric composite material of claim 1, wherein the polymeric composite material is in the shape of a film.

12. The polymeric composite material of claim 1, wherein the polymeric composite material is in the shape of a fiber.

13. The polymeric composite material of claim 12, wherein the fiber is a melt-spun fiber, a dry spun fiber, or a wet-spun fiber.

14. The polymeric composite material of claim 1, comprised in an article of manufacture.

15. The polymeric composite material of claim 14, wherein the article of manufacture is a film, monolith, wafer, blanket, core composite material, a substrate for radiofrequency antenna, substrate for a sunshield, a substrate for a sunshade, a substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, a storage container, a pipe, a tube, a seal, a gasket, aqueous filtration apparatus, oil-based filtration apparatus, and solvent-based filtration apparatus, or any combination thereof.

16. The polymeric composite material of claim 14, wherein the article of manufacture is an injection molded or blow molded article of manufacture.

17. The polymeric composite material of claim 1, wherein the thermoset polymer is epoxy.

18. The polymeric composite material of claim 1, wherein the thermoset polymer is nylon.

19. The polymeric composition material of claim 1, wherein the plurality of aerogel particles do not include an epoxy.

* * * * *